H. HOWARD.
METHOD OF SEPARATING DUST FROM GASES.
APPLICATION FILED JAN. 29, 1909.
970,053. Patented Sept. 13, 1910.
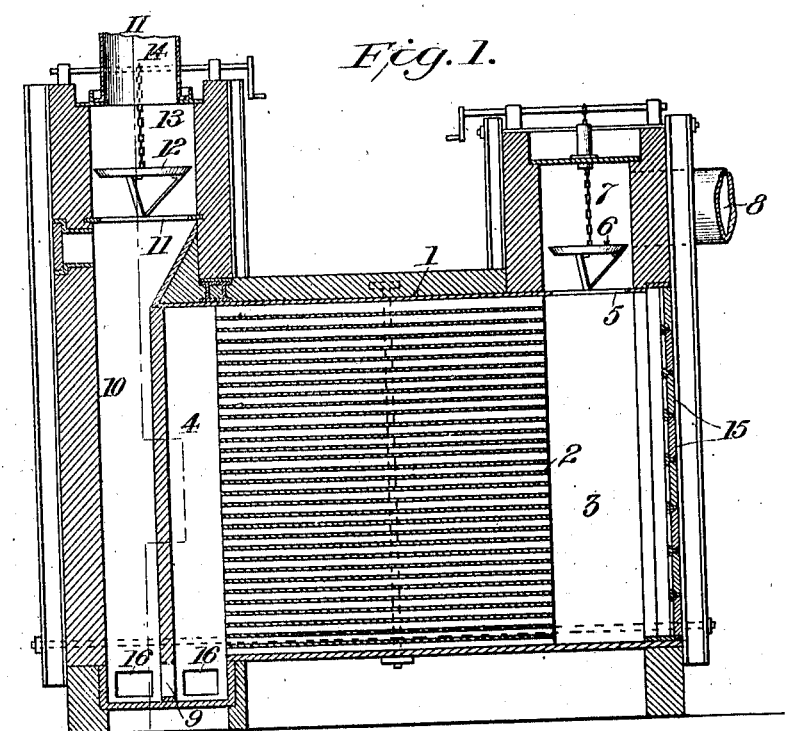
Fig. 1.
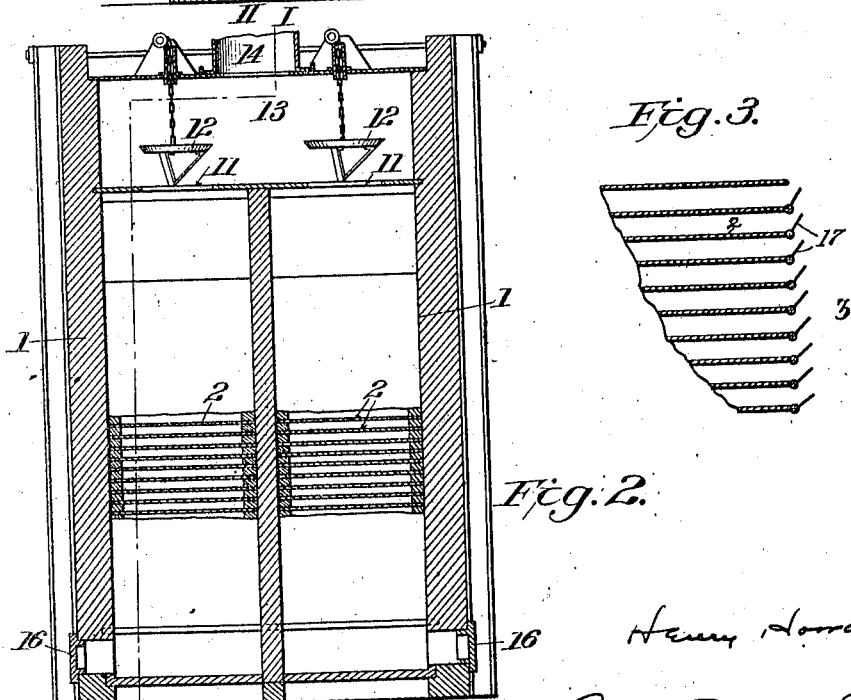
Fig. 2.
Fig. 3.

UNITED STATES PATENT OFFICE.

HENRY HOWARD, OF BOSTON, MASSACHUSETTS.

METHOD OF SEPARATING DUST FROM GASES.

970,053.                    Specification of Letters Patent.    Patented Sept. 13, 1910.

Application filed January 29, 1909. Serial No. 474,956.

*To all whom it may concern:*

Be it known that I, HENRY HOWARD, a citizen of the United States, residing at Boston, in the county of Suffolk and State of Massachusetts, have invented certain new and useful Improvements in Methods of Separating Dust from Gases, of which the following is a specification.

This invention relates to the separation of dust or fume from dust-laden gases, and particularly from the hot gases escaping from roasting or smelting furnaces. For the separation of dust from such gases it is usual to provide large settling chambers, often fitted with internal baffles or the like for directing the gases in a tortuous path through the chamber: such chambers are however quite inefficient as applied to the separation of impalpable fume suspended in the gases escaping from metallurgical furnaces. It has also been proposed to provide in a settling chamber of this character a series of superposed horizontal or inclined shelves, relatively widely separated, for the purpose of shortening the paths of the falling dust particles and therefore permitting a more nearly complete subsidence of the dust in a given length of passage, this construction being equivalent in effect to widening the chamber with a proportionate reduction of its height. It has heretofore been assumed that the function of such shelves was solely to lessen the path of the falling particles to their points of deposit, and in constructions heretofore proposed wherein the spaces between the shelves constitute in fact dust-chambers of considerable height, these shelves appear to possess this function only. I have found however that when the stream of dust-laden gas is confined in close proximity to a dust-retaining surface, as by the provision of metallic shelves separated by a vertical distance of two to three inches or even much less, and so positioned that the dust will not slide upon them, a wholly novel and surprising result is secured, in that the chamber acquires practically the character of a filter, retaining the finest dust particles. The efficiency of the separation is increased out of all proprotion to the reduction in vertical distance between the several shelves; and when it is considered that this increase in efficiency is due to the retention of the finer suspended particles, it is clear that a radical change has occurred in the mode of operation of the apparatus. While all of the phenomena to which this increased efficiency may be due have not been determined it is believed to result chiefly from the retardation by the dust-bed lying upon the shelves, of the lower portion of the shallow confined stream of dust-laden gas, this lower portion in case of closely-spaced shelves comprising a substantial proportion of the whole stream. The dust particles in this retarded portion of the stream rapidly settle out; and in the course of the passage through the apparatus the particles in the more rapidly moving portions of the stream are carried into and trapped or held by the slowly moving portion of the stream, this result being probably aided by eddy currents set up between adjacent portions of the gas stream moving at different velocities. It is further observed in practice that the inlet end of the shelves quickly becomes obstructed and nearly closed by an accumulated deposit of dust, which slowly extends rearwardly or toward the outlet end of the shelves. It is quite probable that the obstructive deposit at the inlet end, by reason of the eddy currents set up in the gases passing it, serves to increase the efficiency of the operation. At suitable intervals, depending upon the dust-content of the gases, the deposit is removed from the shelves, either by a steam or air blast, or by a suitable nozzle, adapted for insertion between the shelves and connected to a vacuum pump or suitable aspirator, appropriate dust-collecting devices being provided, or the dust may be removed by a scraper.

The method may be carried into effect in widely varying forms of apparatus, it being essential merely that the stream of dust-laden gas be confined or directed at low velocity in close proximity to a dust retaining surface. Where a large capacity is required, as is usually the case, a series of such dust-retaining surfaces will be provided, preferably in the form of superposed, closely spaced shelves. In this case the apparatus may be constructed in the general manner described in my prior Patent No. 896,111, the shelves being preferably spaced at distances not exceeding two to three inches in the clear.

Referring to the accompanying drawings, which illustrate a specific apparatus for removing dust from the sulfurous gases produced in pyrites burners,—Figure 1 is a longitudinal vertical section on the line I—I of Fig. 2; Fig. 2 is a transverse vertical section on the line II—II of Fig. 1; and Fig. 3 is a sectional view of the inlet end of a portion of the shelves, showing a modified means for regulating the distribution of the gases.

The apparatus illustrated in Figs. 1 and 2 comprises two parallel rectangular chambers 1, each of which contains a number of superposed horizontal shelves 2. At one end of each set of shelves is a vertical gas-supply passage 3, and at the other end is a vertical gas-discharge passage 4. At the upper end of the supply passage 3 is a gas-inlet 5 controlled by valve 6. Above the valved inlets 5 of the two chambers 1 is a horizontal passage 7 to which the gases are supplied by pipe 8. At the lower end of the vertical passage 4 is an outlet 9 which delivers the gases into an uptake 10 having an outlet 11 controlled by a valve 12. A horizontal passage 13 having a delivery pipe 14 extends over the outlets 11 of both chambers. The outer wall of each chamber, at its receiving-end, is provided with a vertical series of removable tiles 15. Lateral cleaning-openings 16, with doors, are provided at the lower ends of the passages 4, 10.

In operation, the valves 6, 12 are opened and gases supplied through the pipe 8 pass into the horizontal chamber 7 and thence through the openings 5 into the vertical supply-passages 3. The entering gases then subdivide and pass between the shelves, whereon the dust is deposited. The gases leaving the shelves enter the discharge-passages 4 and escape through the openings 9, uptakes 10, openings 11, horizontal passages 13 and pipe 14. The collected dust may be removed from the shelves of either chamber without interrupting the flow of gases by closing its valves 6, 12; removing the tiles 15, forcing the dust from the shelves into the passage 4 and removing it at the bottom through the openings 16.

In order to insure high efficiency of operation it is necessary that the inflowing gas should be distributed with substantial uniformity through the several interspaces, and this distribution presents special difficulties in the case of gases at super-atmospheric temperatures, as those from metallurgical furnaces. Thus, if heated dust-laden gases be introduced into the central or lower portion of a chamber subdivided by horizontal shelves and permitted to escape from the upper portion thereof at the opposite end, it will be found that instead of increasing the efficiency of separation the shelves may actually decrease it, for the reason that the heated gases will tend to flow at increased velocity through a few interspaces in the upper portion of the chamber, without affording sufficient time for settling. In the particular form of apparatus illustrated in Figs. 1 and 2, the necessary uniformity of flow is secured by providing gas-passages extending transversely of the shelves at opposite ends of the chamber, introducing the heated gas into the upper portion of the chamber at one end, and withdrawing the purified and somewhat cooler gas from the lower portion of the passage at the outlet end. This affords an automatic regulation of the flow through the several interspaces, because if the gases tend to flow too rapidly through the upper interspaces, the vertical column of gas in the discharge passage acquires a relatively higher temperature and lower specific gravity, and thereupon exerts a back pressure and retards the movement of gases between the upper shelves. It is clear however that substantial uniformity of flow between the shelves may be otherwise obtained, as for example by a partial closure or regulation of the orifices at the inlet ends of the several interspaces by means of any suitable form of damper or valve, as that illustrated at 17 in Fig. 3. I do not desire therefore to be restricted to the use of any particular apparatus in carrying my method into effect.

I claim:—

The method of separating dust from gases, which consists in passing dust-laden gases at low velocity through interspaces between parallel dust-retaining surfaces, regulating the passage of the gases to secure substantial uniformity of flow between the surfaces, and confining the gases in close proximity to said surfaces.

In testimony whereof I affix my signature in presence of two witnesses.

HENRY HOWARD.

Witnesses:
ALBERT CHAMPION GILBERT,
OSBORNE BEZANSON.